(No Model.)
T. DARK.
PLUMBER'S TRAP.
No. 295,908. Patented Apr. 1, 1884.
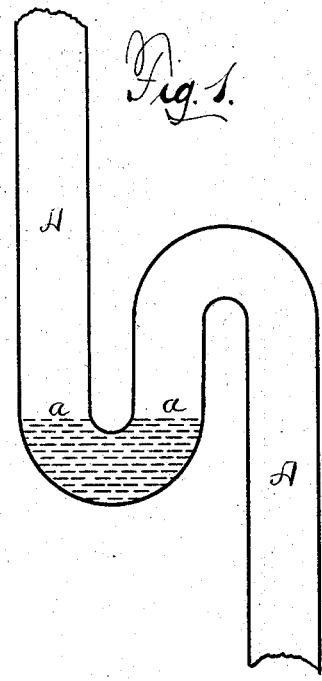
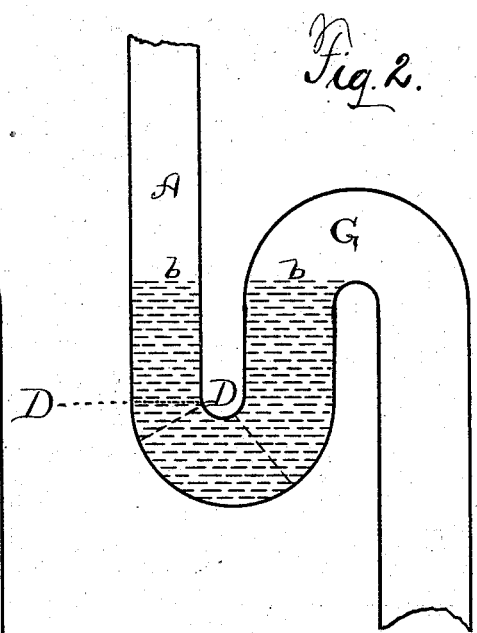

UNITED STATES PATENT OFFICE.

THOMAS DARK, OF BUFFALO, NEW YORK.

PLUMBER'S TRAP.

SPECIFICATION forming part of Letters Patent No. 295,908, dated April 1, 1884.

Application filed April 11, 1883. (No model.)

*To all whom it may concern:*

Be it known that I, THOMAS DARK, a citizen of the United States, residing at Buffalo, in the county of Erie and State of New York, have invented certain new and useful Improvements in Plumbers' Traps, of which the following is a specification, reference being had therein to the accompanying drawings.

The object of this invention is to prevent sewer-gas rising through the traps used in connection with water-closets, sinks, &c., in dwelling-houses.

My invention will be understood as hereinafter set forth.

In the drawings, Figure 1 represents an ordinary S-trap. Fig. 2 represents my improvement therein.

Traps made of the same-sized pipe throughout their entire length are subject to lose too much of the sealing-water on having dumped into them an accumulation of water or other matter. My construction prevents this. I use the old S form, but have changed it by merely enlarging the usual conducting-pipe, A, at and from a point just above or about at the first bend, D, of the trap, (see Fig. 2, shown by dotted lines,) and continuing the enlargement G through the rest of the trap clear to its discharge-point into the sewer. (Not shown.) This enlargement G of the pipe A will be the same in bore from D to exit, and will be in size about one-fourth ($\frac{1}{4}$) larger than the conductor-pipe A, the two different sizes being in one pipe or else suitably connected, as most expedient.

Sewer-traps in which valves are used have heretofore been made with a contracted throat to form the valve-seat and extend a little below it. In this construction the exterior of the pipe is not lessened in diameter; but the interior contraction is produced by thickening the walls of the pipe, which increases the weight and cost of the trap. The smaller length of pipe, which forms a part of my trap, is an ordinary piece of pipe with the usual thickness of wall, and is smaller both inside and outside than the rest of the trap. This reduces the weight of the trap and makes it like any other trap in respect to thickness of wall.

What I desire to claim is—

A stench-trap for water-closets, sewer-sinks, &c., formed of two sizes of pipes, each having the same thickness of wall, a smaller size adapted to extend from the closet or other part to be drained to a point, D, and a larger size adapted to extend from that point to the outlet at the sewer or larger pipe, as set forth.

In witness whereof I affix my signature in presence of two witnesses.

THOMAS DARK.

Witnesses:
J. R. DRAKE,
T. H. PARSONS.